United States Patent
Blinick et al.

(10) Patent No.: US 7,650,467 B2
(45) Date of Patent: *Jan. 19, 2010

(54) COORDINATION OF MULTIPROCESSOR OPERATIONS WITH SHARED RESOURCES

(75) Inventors: Stephen LaRoux Blinick, Tucson, AZ (US); Yu-Cheng Hsu, Tucson, AZ (US); Lucien Mirabeau, Tucson, AZ (US); Ricky Dean Rankin, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/052,569

(22) Filed: Mar. 20, 2008

(65) Prior Publication Data
US 2008/0168238 A1     Jul. 10, 2008

Related U.S. Application Data

(63) Continuation of application No. 11/001,476, filed on Nov. 30, 2004, now Pat. No. 7,418,557.

(51) Int. Cl.
*G06F 13/00* (2006.01)
(52) U.S. Cl. .................. 711/141; 711/146; 711/152; 711/163
(58) Field of Classification Search .............. 711/141, 711/146, 152, 163
See application file for complete search history.

(56) References Cited

U.S. PATENT DOCUMENTS

| | | | |
|---|---|---|---|
| 5,930,821 A | * | 7/1999 | Gaskins et al. .............. 711/146 |
| 6,314,526 B1 | | 11/2001 | Arendt et al. |
| 6,467,050 B1 | | 10/2002 | Keung |
| 6,615,373 B2 | | 9/2003 | Elko et al. |
| 6,622,260 B1 | | 9/2003 | Marisetty et al. |
| 6,751,705 B1 | | 6/2004 | Solomon et al. |
| 6,772,298 B2 | | 8/2004 | Khare et al. |

OTHER PUBLICATIONS

B.M. Ozaki et al., "Software Fault Tolerance in Architectures with Hierarchical Protection Levels", IEEE, Aug. 1988, pp. 31-43.

(Continued)

*Primary Examiner*—Reba I Elmore
(74) *Attorney, Agent, or Firm*—William K. Konrad; Konrad Raynes & Victor LLP

(57) ABSTRACT

In managing multiprocessor operations, a first processor repetitively reads a cache line wherein the cache line is cached from a line of a shared memory of resources shared by both the first processor and a second processor. Coherency is maintained between the shared memory line and the cache line in accordance with a cache coherency protocol. In one aspect, the repetitive cache line reading occupies the first processor and inhibits the first processor from accessing the shared resources. In another aspect, upon completion of operations by the second processor involving the shared resources, the second processor writes data to the shared memory line to signal to the first processor that the shared resources may be accessed by the first processor. In response, the first processor changes the state of the cache line in accordance with the cache coherency protocol and reads the data written by the second processor. Other embodiments are described and claimed.

22 Claims, 2 Drawing Sheets

OTHER PUBLICATIONS

Y. Tamir et al., "Application-Transparent Process-Level Error Recovery for Multicomputers", IEEE, 1989, pp. 296-305.
IBM Corp., "Dynamically Structured Messaging Mechanism", Document #444187, Research Disclosure, Apr. 2001, pp. 681-686.
D.J. Sorin et al., "SafetyNet: Improving with Availability of Shared Memory Multiprocessors with Global Checkpoint/Recovery", IEEE, 2002, pp. 123-134.
PCT Search Report dated Jul. 2, 2006 for Application No. PCT/EP2005/055907 filed Nov. 11, 2005.
PCT Written Opinion dated Jul. 2, 2006 for Application No. PCT/EP2005/055907 filed Nov. 11, 2005.
L.M. Silva et al., "Global Checkpointing for Distributed Programs", IEEE, 1992, pp. 155-162.

* cited by examiner

COORDINATION OF MULTIPROCESSOR OPERATIONS WITH SHARED RESOURCES

RELATED APPLICATIONS AND FIELD OF THE INVENTION

The present application is a continuation application of copending application Ser. No. 11/001,476, filed Nov. 30, 2004, assigned to the assignee of the present application and incorporated by reference in its entirety. The present invention relates to managing multiprocessor operations.

BACKGROUND

Description of the Related Art

In certain computing environments, multiple host systems may communicate with a control unit, such as an IBM Enterprise Storage Server (ESS)®, for data in a storage device managed by the ESS receiving the request, providing access to storage devices, such as interconnected hard disk drives through one or more logical paths (IBM and ESS are registered trademarks of IBM). The interconnected drives may be configured as a Direct Access Storage Device (DASD), Redundant Array of Independent Disks (RAID), Just a Bunch of Disks (JBOD), etc. The control unit may be a multiprocessor type system. For example, the control unit may include duplicate and redundant processing complexes, also known as clusters, to allow for failover to a surviving cluster in case one fails.

There are various types of multiprocessor systems. In one type, processors may each have their own memory and cache. The processors may run in parallel and share disks. In one type of multiprocessor system, each processor may run a copy of the operating system and the processors may be loosely coupled through a Local Area Network (LAN), for example. Communication between processors may be accomplished through message-passing.

In another type of multiprocessor system, the processors may be more tightly coupled, such as connected through a switch or bridge. Communication between the processors may be accomplished through a shared memory, for example.

In yet another type of multiprocessor system, only one copy of the operating system may run across all of the processors. These types of multiprocessor systems tend to be tightly coupled inside the same chassis with a high-speed bus or a switch. Moreover, the processors may share the same global memory, disks, and Input/Output (I/O) devices.

Should a shared resource such as a shared disk fail, the processors of the multiprocessor system may simply cease using the failed disk. In a multiprocessor system in which one copy of the operating system runs across the processors of the system, recovery operations may be readily coordinated. For example, if a shared resource such as a bridge may be restored by one of the processors performing recovery operations such as resetting the bridge, those recovery operations may be coordinated amongst the various processors by the common operating system of the processors.

Each processor in a multiprocessor system may also have a cache in which one or more lines of a shared memory may be cached. Thus, two or more caches may have copies of the same line of shared memory. If one processor changes the data in a line of shared memory cached in the caches of other processors, the various caches may have different, incorrect versions of the line of shared memory. As a result, the cached data may no longer be "coherent" with respect to other caches or the shared memory.

Various cache coherency protocols may be employed to synchronize data amongst several caches. One cache coherency protocol marks each cache line with one of four states, Modified, Exclusive, Shared, or Invalid (MESI). A cache line marked as being in the Modified state indicates that the cache line was modified and therefore the underlying data in the line of shared memory is no longer valid. A cache line marked as being in the Exclusive state indicates that the cache line is only stored in that particular cache and has not yet been changed. A cache line marked as being in the Shared state indicates that the particular cache line may be stored in other caches of the other processors. A cache line marked as being in the Invalid state indicates that the cache line is invalid.

Snooping logic is typically employed utilizing a particular coherency protocol to provide for cache coherency. Snooping logic in the processor may broadcast a message over a common bus line shared by the other processors, informing the other processors each time a processor modifies data in its cache. The snooping logic may also snoop on the bus looking for such messages from other processors.

When a processor detects that another processor has changed a value at an address existing in its own cache, the snooping logic invalidates that entry in its cache in accordance with various protocols including the MESI protocol. The invalid state marking of the cache line can inform the processor that the value in the cache is not valid. As a result, the processor can look for the correct value in the shared memory or in another cache.

SUMMARY

In managing multiprocessor operations, a first processor repetitively reads a cache line wherein the cache line is cached from a line of a shared memory of resources shared by both the first processor and a second processor. Coherency is maintained between the shared memory line and the cache line in accordance with a cache coherency protocol. In one aspect, the repetitive cache line reading occupies the first processor and inhibits the first processor from accessing the shared resources. In another aspect, upon completion of operations by the second processor involving the shared resources, the second processor writes data to the shared memory line to signal to the first processor that the shared resources may be accessed by the first processor. In response, the first processor changes the state of the cache line in accordance with the cache coherency protocol and reads the data written by the second processor. Other embodiments are described and claimed.

DETAILED DESCRIPTION

Figure 1:
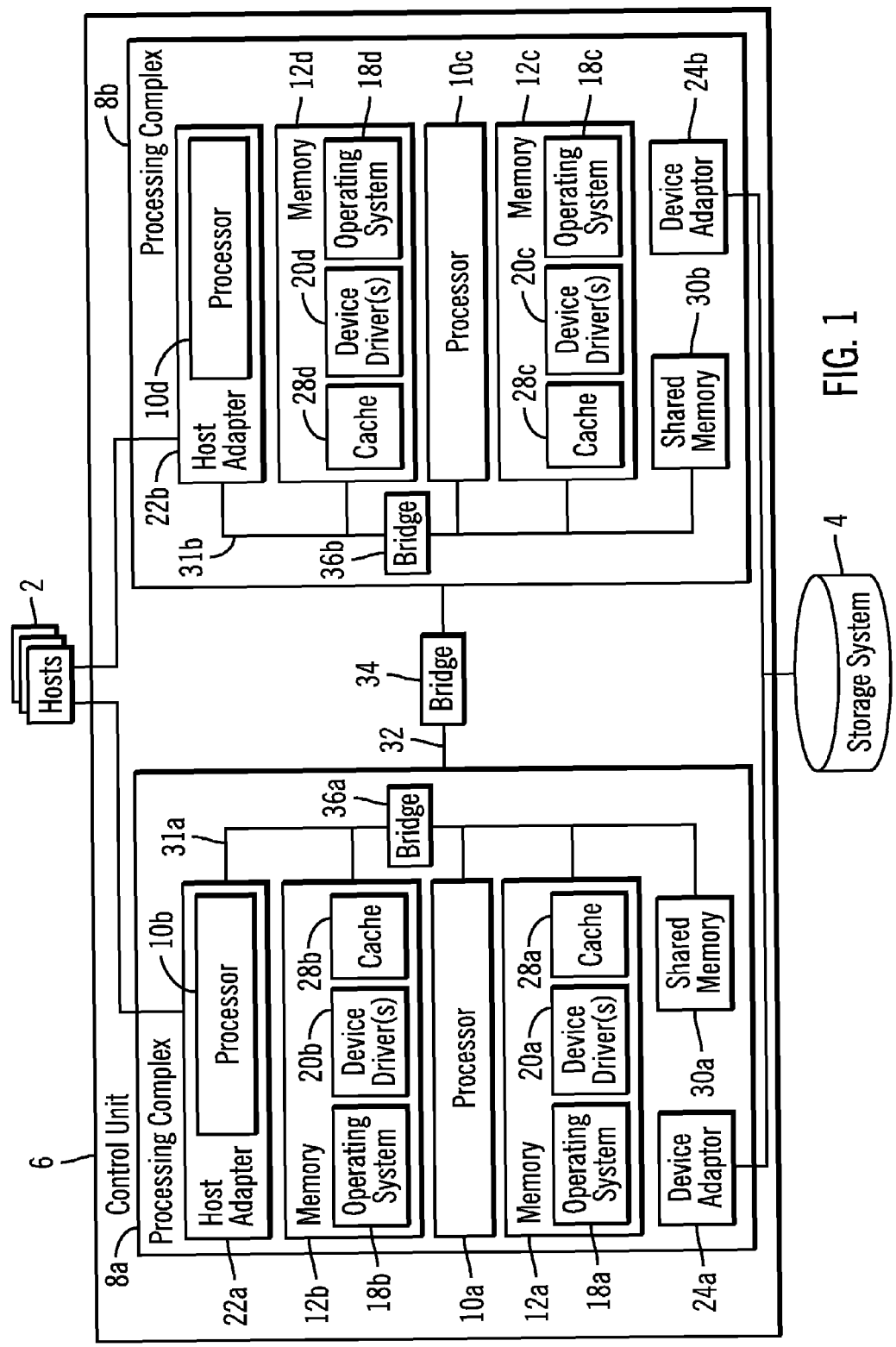
FIG. 1 illustrates a computing environment in which embodiments are implemented.

FIG. 1 illustrates one example of a computing environment in which aspects of the description provided herein may be employed. One or more hosts 2 communicate Input/Output (I/O) requests directed to a storage system 4 to a control unit 6, where the control unit 6 manages access to the storage system 4. In one embodiment, the control unit 6 is comprised of two processing complexes 8a, 8b, each including a processor 10a, 10c and a host adapter 22a, 22b. Each host adapter 22a, 22b enables the associated processing complex 8a, 8b to communicate with the hosts 2, and includes a processor 10b, 10d. In the illustrated embodiment, each processor 10a, 10b, 10c, 10d has an associated memory 12a, 12b, 12c, 12d, respectively, and separately executes an operating system 18a, 18b, 18c, 18d, respectively, and device drivers 20a, 20b, 20c, 20d, respectively. The operating systems 18a, 18b, 18c, 18d may be the same type as each other or may each be an entirely different type of operating system. For example, the operating systems 18a, 18c may each be an embedded multithreaded operating system such as LINUX, for example, and the operating systems 18b, 18d may each be an embedded hardware abstraction layer executing real time tasks for a host adapter, for example. It is appreciated that various types and combinations of operating systems may be used, depending upon the particular application.

Each device driver 20a, 20b, 20c, 20d provides an interface between the associated operating system 18a, 18b, 18c, 18d in the processing complex 8a, 8b in which the device driver 20a, 20b, 20c, 20d executes, and an internal or external device, such as the host adaptors 22a, 22b and various device adaptors 24a, 24b. Device adaptors 24a, 24b enable the processing complexes 8a, 8b to communicate with the storage system 4. Although the illustrated embodiment shows the control unit 6 having two of various components, such as the processing complexes 8a, 8b, device adaptors 24a, 24b etc., it is appreciated that the control unit 6 may have a greater or lesser number of such components.

The processing complex 8a may have a shared memory 30a coupled to a bus 31a, and shared by the processor 10a and the processor 10b of that processing complex 8a. Each memory 12a, 12b may have a cache 28a, 28b, in which one or more lines of a shared memory 30a may be cached. Similarly, the processing complex 8b may have a shared memory 30b coupled to a bus 31b, and shared by the processor 10c and the processor 10d of that processing complex 8b. Each memory 12c, 12d may have a cache 28c, 28d, in which one or more lines of a shared memory 30b may be cached. The caches 28a, 28b, 28c, 28d may cache lines of other memories of the control unit 6.

Each processing complex 8a, 8b may be on separate power boundaries. The processing complexes 8a, 8b may be assigned to handle I/O requests directed to specific volumes configured in the storage system 4. The processing complexes 8a, 8b communicate with the storage system 4, via the device adaptors 24a, 24b, 24c, 24d, over a device network (not shown), which may comprise a local area network (LAN), storage area network (SAN), bus interface, serial interface, etc.

Further, the processing complexes 8a, 8b communicate over a connection 32 which includes a bridge 34, enabling processor inter-communication to manage configuring operations performed with respect to the shared devices, such as the shared adaptors 22a, 22b. In a similar manner, each processing complex 8a, 8b has a bridge 36a, 36b. The bridge 36a is a resource shared by the processors 10a, 10b. Similarly, the bridge 36b is a resource shared by the processors 10c, 10d.

As explained in greater detail below, coordination of processor activities may also be achieved using a processor cache 28a, 28b, 28c, 28d and a cache coherency protocol. For example, a shared resource such as the bridge 36a may malfunction and may be required to be reset to be restored to proper functioning. This recovery operation may be coordinated amongst the processors 10a, 10b using one or more processor caches 28a, 28b and a cache coherency protocol. In a similar manner, a shared resource such as the bridge 36b may malfunction and may be required to be reset to be restored to proper functioning. This recovery operation may be coordinated amongst the processors 10c, 10d using one or more processor caches 28c, 28d and a cache coherency protocol.

The control unit 6 may comprise any type of server, such as an enterprise storage server, storage controller, etc., or other device used to manage I/O requests to attached storage system (s) 4, where the storage systems may comprise one or more storage devices known in the art, such as interconnected hard disk drives (e.g., configured as a DASD, RAID, JBOD, etc.), magnetic tape, electronic memory, etc. The hosts 2 may communicate with the control unit 6, via the adaptors 22a, 22b over a network (not shown), such as a Local Area Network (LAN), Storage Area Network (SAN), Wide Area Network (WAN), wireless network, etc. Alternatively, the hosts 2 may communicate with the control unit 6 over a bus interface, such as a Peripheral Component Interconnect (PCI) bus or serial interface. A failure at a shared device, such as a shared adaptor 22a, 22b could generate machine check conditions to the operating systems 18a, 18b, 18c, 18d in the processing complexes 8a, 8b which could cause both processing complexes to crash if the shared hardware has a type of fatal error. Copending and commonly assigned patent application entitled "METHOD, SYSTEM, AND PROGRAM FOR HANDLING A DEVICE FAILURE", having Ser. No. 10/987,572, filed Nov. 12, 2004, which patent application is incorporated herein by reference in its entirety, describes techniques to fence off a failed shared device to avoid the situation where a fatal device error could cause both processing complexes 8a, 8b to crash. In one embodiment, these recovery operations may be coordinated through a shared device such as the bridge 34.

Figure 2:
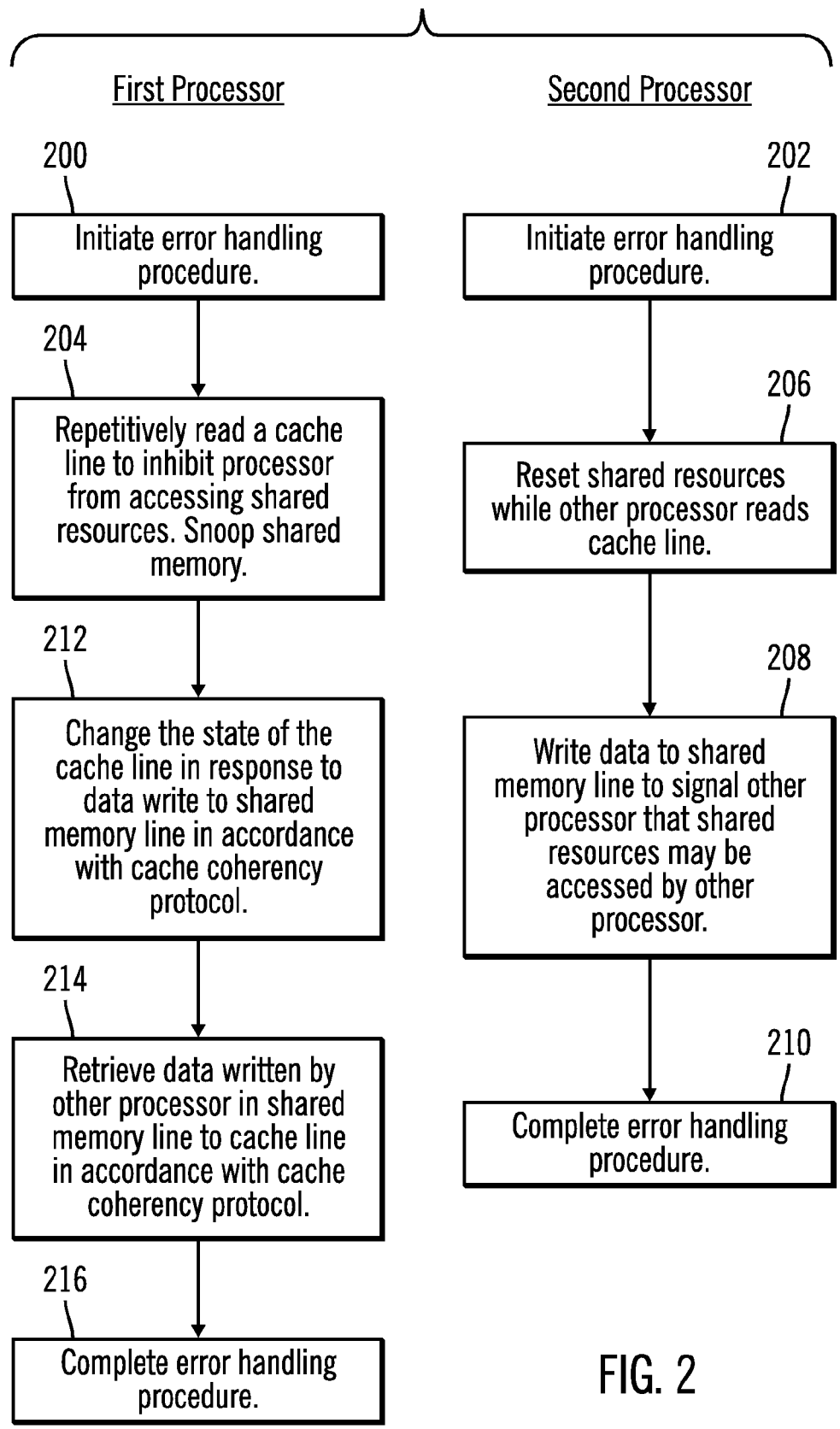
FIG. 2 illustrates operations to manage multiprocessor operations.

FIG. 2 illustrates an embodiment in which operations of processors of a multiprocessor system may be coordinated using a processor cache, a shared memory and a cache coherency protocol. For example, the bridge 36a of the processing complex 8a may fail. To coordinate recovery operations among the processors 10a, 10b, one of the caches 28a, 28b may be utilized with the shared memory 30a and a cache coherency protocol.

In this example, the shared resource such as the bridge 36a may issue interrupts to each of the processors 10a, 10b, upon entering an error condition. In response to receipt of such an interrupt, a first processor such as the processor 10a may initiate (block 200) an error handling procedure. Similarly, a second processor such as the processor 10b may initiate (block 202) a second error handling procedure. It is appreciated that other events may be utilized by the processors 10a, 10b to initiate error handling procedures. For example, the processors 10a, 10b may monitor the status of various shared devices and initiate error handling procedures upon detection of an error status.

In accordance with the error handling procedure of the first processor 10a, the first processor 10a repetitively reads (block 204) a cache line such as a line of the cache 28a. In this example, the repetitive cache line reading occupies the first processor 10a and inhibits the first processor 10a from accessing the shared resources including the bridge 36a. This repetitive reading may be achieved using a loop process, for example.

Furthermore, the cache line being repetitively read by the first processor 10a is cached from a line of a shared memory of resources shared by both the first processor 10a and the second processor 10b. In this example, the cache line may be cached from a line of the shared memory 30a. In addition, coherency is maintained between the shared memory line and the cache line in accordance with a cache coherency protocol such as the MESI, protocol, for example. In the MESI protocol, the state of the cache line being read becomes Exclusive to the first processor 10a. It is appreciated that other cache coherency protocols may be utilized as well. In accordance with this protocol, the first processor 10a also snoops (block 204) the shared memory 30a via the shared bus 31a to identify changes to the cached memory line from the shared memory 30a.

With the first processor 10a inhibited from accessing shared resources such as the bridge 36a, the second processor 10b, in executing its error handling procedure, can safely reset (block 206) a shared resource such as the bridge 36a without interference from the first processor 10a. It is appreciated that the error handling procedures which can be undertaken by the second processor 10b while the first processor 10a is inhibited from accessing a shared resource can include other actions such as fencing off a failed resource or taking other action to restore a failed resource.

At an appropriate time, the second processor 10b may write (block 208) data to the shared memory line of the shared memory 30a, which shared memory line has been cached by the first processor cache 28a. As set forth below, this data write by the second processor 10b may be used to provide a signal to the first processor 10a that it is safe for the first processor to resume accessing the shared resource. Thus, for example, one appropriate time for the second processor 10b to write data to the shared memory line of the shared memory 30a may be upon completion of the bridge 36a resetting operations by the second processor 10b which resulted in a successful restoration of the shared resource or at least a portion of the shared resource or resources. Thus the second processor 10b may complete (block 210) its error handling procedure. It is appreciated that the write to the cached memory line in the shared memory 30a by the second processor 10b may be done to signal other information to the other processor 10a and may be done at other times, depending upon the particular application.

In the illustrated embodiment, the first processor 10a snooping the shared memory 30a via the shared bus 31a detects this write to the cached memory line in the shared memory 30a by the second processor 10b. In accordance with the cache coherency protocol which is the MESI cache coherency protocol in this example, the first processor 10a changes (block 212) the state of the cache line in the cache 28a in response to the data write to the shared memory line in the shared memory 30a by the second processor 10b. In accordance with the MESI cache coherency protocol, the state of the cache memory line in the first processor cache 28a is changed to the Invalid state. In addition, the first processor 10a may leave a loop process of repetitively reading the memory line in the cache 28a and retrieve (block 214) the updated data written to the cached memory line in the shared memory 30a. If the failed resource is a bridge to the shared memory 30a, for example, the shared resource will have been restored by the second processor 10b such that the first processor 10a can safely access the restored shared resources.

In another operation, the first processor completes (block 216) its error handling procedure. If the second processor 10b has fully restored the system of all error states, the first processor can resume its normal processing. In another example, the restoration operations of the second processor may be incomplete. In this example, the processors 10a and 10b can switch roles and resume the restoration process. Thus the processor 10b may be designated the "first processor" of FIG. 2 and the processor 10a may be designated the "second processor" of FIG. 2.

In accordance with the error handling procedure of the first processor 10b, the first processor 10b repetitively reads (block 204) a cache line such as a line of the cache 28b. In this example, the repetitive cache line reading occupies the first processor 10b and inhibits the first processor 10b from accessing the shared resources including the bridge 36a. With the first processor 10b inhibited from accessing shared resources such as the bridge 36a, the second processor 10a, in executing its error handling procedure, can safely reset (block 206) a shared resource such as the bridge 36a without interference from the first processor 10b. At an appropriate time, the second processor 10a may write (block 208) data to the shared memory line of the shared memory 30a, which shared memory line has been cached by the first processor cache 28b, to signal the other processor 10b that it may safely access the shared resource, and the second processor 10a may complete (block 210) its error handling procedure.

The first processor 10b snooping the shared memory 30a via the shared bus 31a detects this write to the cached memory line in the shared memory 30a by the second processor 10a. In accordance with the cache coherency protocol, the first processor 10b changes (block 212) the state of the cache line in the cache 28b to the invalid state in response to the data write to the shared memory line in the shared memory 30a by the second processor 10a. In addition, the first processor 10b may leave a loop process of repetitively reading the memory line in the cache 28b and retrieve (block 214) the updated data written to the cached memory line in the shared memory 30a. If the failed resource is a bridge to the shared memory 30a, for example, the shared resource will have been restored by the second processor 10a such that the first processor 10b can safely access the restored shared resources.

In another operation, the first processor 10b completes (block 216) its error handling procedure. If the second processor 10a has fully restored the system of all error states, the first processor 10b can resume its normal processing. In another example, the restoration operations of the second processor 10a may still be incomplete. In this example, the processors 10a and 10b can again switch roles to complete the restoration or other process.

Further, a time limit may be set for each processor to repetitively read a cache line (block 204). For example, if a time limit expires before the cache line state changes from Exclusive state to the Invalid state, the first processor may, in one embodiment, assume the other, second processor is dead. If so the first processor can take over the role of the second processor and execute the second processor recovery procedure including resetting the shared resource (block 206).

It is appreciated that a shared resource such as the bridge 36b of the processing complex 8b may fail. To coordinate recovery operations among the processors 10c, 10d, one of the caches 28c, 28d may be utilized with the shared memory 30b and a cache coherency protocol.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable storage medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, transmission media may comprise, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any information bearing medium known in the art.

Certain embodiments may be directed to a method for deploying computing instruction by a person or automated processing integrating computer-readable code into a computing system, wherein the code in combination with the computing system is enabled to perform the operations of the described embodiments.

In embodiments where the processing complexes have multiple logical partitions, the supervisor manages the execution of different logical partitions. In embodiments, where the processing complex does not have logical partitions, the supervisor module may comprise an intermediate device driver and an operating system which may be a different type from the operating system of the other processing complex or may be the same, depending upon the particular application.

In the described embodiments, the control unit 6 included two processing complexes 8a, 8b. In additional embodiments, there may be more than two systems accessing a shared device. In such embodiments, the device driver 20a receiving the interrupt may communicate with multiple processing complexes to coordinate restoration or other operations.

The illustrated operations of FIG. 2 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and explanation. It is not intended to be exhaustive or to limit to the precise form disclosed. Many modifications and variations are possible in light of the above teaching.

What is claimed is:

1. A system, comprising:
   a first processor having a cache;
   a second processor;
   a plurality of shared resources including a shared memory wherein said first processor has logic adapted to cache a line of said shared memory in a line of said first processor cache and to maintain coherency between said shared memory line and said cache line in accordance with a cache coherency protocol;
   said first processor having logic adapted to repetitively read said cache line to occupy said first processor using said repetitive cache line reading to inhibit said first processor from accessing said shared resources;
   said second processor having logic adapted to write data to said shared memory line to signal to said first processor that said shared resources may be accessed by said first processor; and
   said first processor having logic adapted to change the state of said cache line in response to said data write to said shared memory line in accordance with said cache coherency protocol.

2. The system of claim 1 wherein said first processor logic is further adapted to retrieve said data written by second processor in said shared memory line to said cache line in accordance with said cache coherency protocol.

3. The system of claim 2 wherein said first processor logic is further adapted to execute a first error handling procedure which includes said cache line reading, said cache line state changing and said shared memory line reading.

4. The system of claim 3 wherein said second processor logic is further adapted to execute a second error handling procedure which includes resetting a shared resource while said first processor reads said cache line, and writing said data to said shared memory line upon completion of said shared resource resetting.

5. The system of claim 4 wherein a shared resource has logic adapted to issue first and second interrupts to said first and second processors, respectively in the event of an error condition wherein said first processor logic executes said first error handling procedure in response to said first interrupt and said second processor logic executes said second error handling procedure in response to said second interrupt.

6. The system of claim 5 wherein said second processor has a second cache line and wherein said second processor logic is further adapted to read said second cache line and to cache in the second cache line, a line of a shared memory of said resources shared by both said first processor and a second processor, and to maintain coherency between said shared memory line and said second cache line in accordance with a cache coherency protocol, and to occupy said second processor using said second cache line reading to inhibit said second processor from accessing said shared resources;
   said first processor logic being adapted to write data to said shared memory line from which said second cache line is cached, to signal to said second processor that shared resources may be accessed by said second processor; and
   said second processor logic being adapted to change the state of said second cache line in response to said data write to said shared memory line in accordance with said cache coherency protocol.

7. The system of claim 6 wherein said second processor logic is further adapted to snoop to detect said first processor writing data in said shared memory; and
   wherein said second processor logic is further adapted to read said data written by first processor in said shared memory line from which said second cache line is cached, to said second cache line in accordance with said cache coherency protocol.

8. The system of claim 7 wherein said second processor logic is further adapted to execute a third error handling procedure which includes said second cache line reading, said second cache line state changing and said shared memory line reading.

9. The system of claim 8 wherein said first processor logic is further adapted to execute a fourth error handling procedure which includes a resetting of a shared resource while said second processor reads said second cache line, and writing said data to said shared memory line from which said second cache line is cached, upon completion of shared resource resetting.

10. The system of claim 1 wherein said first processor logic is further adapted to snoop to detect said second processor writing data to said shared memory line.

11. The system of claim 1 wherein said first processor logic is further adapted to determine that a time period has expired while repetitively reading said cache line; and upon expiration of said time period, to execute a second error handling procedure which includes resetting a shared resource.

12. An article of manufacture, comprising at least one of a hardware device having hardware logic, and a computer readable storage medium having code, enabled to be executed by a system to perform operations, wherein the system has a first processor having a cache, a second processor, and a plurality of shared resources including a shared memory wherein a line of said shared memory is cached in a line of said first processor cache and coherency is maintained between said shared memory line and said cache line in accordance with a cache coherency protocol, and wherein the operations comprise:

said first processor repetitively reading said cache line wherein said repetitive cache line reading occupies said first processor and inhibits said first processor from accessing said shared resources;

said second processor writing data to said shared memory line to signal to said first processor that said shared resources may be accessed by said first processor; and said first processor changing the state of said cache line in response to said data write to said shared memory line in accordance with said cache coherency protocol.

13. The article of claim 12 wherein said operations further comprise said first processor retrieving said data written by second processor in said shared memory line to said cache line in accordance with said cache coherency protocol.

14. The article of claim 13 wherein said operations further comprise said first processor executing a first error handling procedure which includes said cache line reading, said cache line state changing and said shared memory line reading.

15. The article of claim 14 wherein said operations further comprise said second processor executing a second error handling procedure which includes resetting a shared resource while said first processor reads said cache line, and writing said data to said shared memory line upon completion of said shared resource resetting.

16. The article of claim 15 wherein said operations further comprise a shared resource issuing first and second interrupts to said first and second processors, respectively in the event of an error condition wherein said first processor executes said first error handling procedure in response to said first interrupt and said second processor executes said second error handling procedure in response to said second interrupt.

17. The article of claim 16 wherein said second processor has a second cache line and wherein said operations further comprise:

said second processor reading said second cache line and wherein the second cache line is cached from a line of a shared memory of said resources shared by both said first processor and a second processor, wherein coherency is maintained between said shared memory line and said second cache line in accordance with a cache coherency protocol, and wherein said second cache line reading occupies said second processor and inhibits said second processor from accessing said shared resources;

said first processor writing data to said shared memory line from which said second cache line is cached, to signal to said second processor that shared resources may be accessed by said second processor; and said second processor changing the state of said second cache line in response to said data write to said shared memory line in accordance with said cache coherency protocol.

18. The article of claim 17 wherein said operations further comprise said second processor snooping to detect said first processor writing data in said shared memory, and reading said data written by first processor in said shared memory line from which said second cache line is cached, to said second cache line in accordance with said cache coherency protocol.

19. The article of claim 18 wherein said operations further comprise said second processor executing a third error handling procedure which includes said second cache line reading, said second cache line state changing and said shared memory line reading.

20. The article of claim 19 wherein said operations further comprise said first processor executing a fourth error handling procedure which includes a resetting of a shared resource while said second processor reads said second cache line, and writing said data to said shared memory line from which said second cache line is cached, upon completion of shared resource resetting.

21. The article of claim 12 wherein said operations further comprise said first processor snooping to detect said second processor writing data to said shared memory line.

22. The article of claim 12 wherein said operations further comprise said first processor determining that a time period has expired while repetitively reading said cache line; and upon expiration of said time period, executing a second error handling procedure which includes resetting a shared resource.

* * * * *